United States Patent [19]
Agari

[11] Patent Number: 5,248,203
[45] Date of Patent: Sep. 28, 1993

[54] RETAINER FOR USE IN A LINEAR MOTION ROLLING CONTACT GUIDE UNIT

[75] Inventor: Norimasa Agari, Seki, Japan

[73] Assignee: Nippon Thompson Co., Ltd., Tokyo, Japan

[21] Appl. No.: 935,849

[22] Filed: Aug. 26, 1992

[30] Foreign Application Priority Data

Aug. 29, 1991 [JP] Japan .................. 3-244687

[51] Int. Cl.$^5$ ................................ F16C 29/04
[52] U.S. Cl. ................................ 384/49; 384/56
[58] Field of Search ........................ 384/49-51, 384/56

[56] References Cited

U.S. PATENT DOCUMENTS 2,887,344 5/1959 Hause ..................... 384/49
3,145,065 8/1964 Cator ..................... 384/49

Primary Examiner—Thomas R. Hannon
Attorney, Agent, or Firm—Skjerven, Morrill, MacPherson, Franklin, & Friel

[57] ABSTRACT

A retainer for use in a linear motion rolling contact guide unit including a rail, a slider and a plurality of rolling members interposed between the rail and the slider is provided. The retainer is generally comprised of an elongated rectangular plate having a predetermined thickness and width. The retainer plate is formed with a plurality of pockets for receiving therein rolling members so as to keep the rolling members in position. In accordance with the present invention, the pockets have a first size in the transverse direction slightly larger than the characteristic size, e.g., diameter in the case of balls, of rolling members and a second size in the longitudinal direction substantially larger than the first size so that the pockets are generally in the shape of a slot with either a circular pocket provided in a central portion of the plate or the second size being large enough to accommodate two balls with a separator therebetween. With this structure, the sliding resistance of the retainer and thus the linear motion guide unit is significantly reduced.

9 Claims, 3 Drawing Sheets

RETAINER FOR USE IN A LINEAR MOTION ROLLING CONTACT GUIDE UNIT

BACKGROUND OF THE INVENTION

1. Field of the Invention

This invention generally relates to a linear motion rolling contact guide unit, and, in particular, to a retainer for use in a finite stroke type linear motion rolling contact guide unit for retaining its rolling members in position.

2. Description of the Prior Art

A linear motion rolling contact guide unit is well known in the art, and, it generally includes a rail extending straight over a desired length, a slider slidably mounted on the rail and a plurality of rolling members interposed between the rail and the slider. Such a linear motion rolling contact guide unit can be either of the infinite stroke type or of the finite stroke type. In the former case, an endless circulating path, in which the rolling members are provided, is provided between the rail and the slider so that theoretically an infinite relative motion can be provided between the rail and the slider as long as the rail extends. On the other hand, in the latter case, only a straight guide channel is provided between the rail and the slider in which the rolling members move rolling back and forth so that only a finite stroke can be provided for a relative movement between the rail and the slider.

A finite stroke type linear motion rolling contact guide unit for which the present invention can be advantageously applied is illustrated in FIGS. 6 and 7. As shown, the finite stroke type linear motion rolling contact guide unit includes a bed or rail 28 extending straight over a desired length and having a generally rectangular cross section, a table or slider 29 slidably mounted on the rail 28, and a plurality of rolling members or balls 31 in the illustrated embodiment interposed between the rail 28 and the slider 29.

The rail 28 is formed with a pair of inner guide grooves 35 located one at each side surface thereof and extending in parallel with the longitudinal axis of the rail 28. The slider 29 has a horizontal section extending horizontally over the rail 28 and a pair of vertical sections each depending from a corresponding side of the horizontal section and spaced apart from the associated side surface of the rail 28. An inner guide groove 34 is formed at an inner side surface of each of the vertical sections of the slider 29 in an opposed relationship with the associated inner guide groove 35 to thereby define a straight guide channel between the rail 28 and the slider 29.

A plurality of balls 31 as rolling members are provided in each of the guide channels such that they are partly received in each of the oppositely arranged inner and outer guide grooves 35 and 34. Also provided in each of the guide channels is a retainer 30 for retaining the balls 31 spaced apart from each other and in position. The retainer 30 includes an elongated plate formed with a plurality of pockets 32 spaced apart from each other at an equal interval each receiving therein one of the balls 31 rotatably. The balls 31 may be maintained in position in the guide channel by the retainer 30 even if the slider 29 moves relative to the rail 28. However, since each of the pockets 32 is substantially identical in shape and size, and the pockets 32 are circular in shape and approximately equal to the diameter of the balls 31 with a slight gap therebetween so as to allow the ball 31 to rotate therein.

However, such a structure has been found to be disadvantageous in some cases, in particular when used under a preloaded condition, because of an increased sliding resistance between the rail 28 and the slider 29. When preloaded, the internal gap between the balls 31 and each of the rail 28 and the slider 29 is set to be negative in value as shown in FIGS. 6 and 7, and a linear motion guide unit having such a preloaded condition can provide an enhanced accuracy and smooth operation. Several causes are possible in increasing the sliding resistance, such as a slight error in the degree of parallelism between the inner and outer guide grooves 35 and 34, variations in the lubricating condition along each of the guide channels; however, no truly viable solution to keep the sliding resistance lower has been proposed prior to the present invention. It is the present inventor that has pinpointed the major reason for an increase of the sliding resistance as a result of an extensive study regarding the causes of an increase of the sliding resistance between the rail and the slider. That is, according to the study made by the present inventor, it has been found that an interaction between the rolling members, typically balls or rollers, and the retainer plays an important role in the increase of the sliding resistance between the rail and the slider.

Therefore, there has been a need to provide an improved retainer which can allow to keep the interaction with the rolling members as small as possible to thereby keep the sliding resistance of a linear motion guide unit as low as possible at all times. In addition, after using a linear motion guide unit for some time, there may occur a case in which the distance between the center line or longitudinal axis of the rail 28 or slider 29 and the center line of the retainer 30 vary or fluctuate, which is disadvantageous because of a degradation of the accuracy in linear motion. Thus, there also has been a need to solve such a problem.

SUMMARY OF THE INVENTION

In accordance with the present invention, there is provided an improved retainer for use in a linear motion guide unit for retaining rolling members in position. In one embodiment, the retainer includes an elongated plate provided with a plurality of windows or pockets, at least some of which have a first size larger than the diameter of the rolling member in its transverse direction and a second size substantially larger than the first size in its longitudinal direction in parallel with the longitudinal axis of the elongated plate. Preferably, all of the pockets have a slot shape defined by the first and second sizes. In one modification, the second size increases gradually toward each end of the elongated plate. Preferably, the first size is slightly larger than the diameter of the rolling members. In another modification, the second size has a plurality of values. In a further modification, the second size is set to be large enough to receive two or more rolling members. In a still further embodiment, when the second size of the pocket is large enough to locate two or more rolling members in one pocket, the pocket is formed with at least one inwardly extending projection to separate any two adjacent rolling members.

With provision of the present retainer in a linear motion guide unit, when the slider moves relative to and along the rail as shown in FIGS. 6 and 7, the rolling members also move relative to the rail and along the rail generally at a speed half of that of the slider. Thus, the retainer also moves at a speed same as the average speed of the centers of the rolling members relative to the rail. In this instances, the travelling speeds of individual rolling members may vary depending on various reasons, such as slight differences in size of rolling members, variations of planarity along the guide channel and variations of lubricating conditions along the guide channel. In such a situation, if the pockets of the retainer for receiving therein rolling members were identical in shape and size and approximately the same as that of the rolling members as in the prior art, the rolling members would immediately interact with the retainer, so that a significant sliding resistance could be present between the rolling members and the slider at all times. However, with the provision of the present retainer, a retainer is so structured that the number of the rolling members which may come into interaction with the retainer at the same time is reduced, and the sliding resistance can be maintained at a lower level at all times.

It is therefore a primary object of the present invention to provide an improved linear motion rolling contact guide unit having a reduced sliding resistance.

Another object of the present invention is to provide an improved retainer for use in a linear motion guide unit.

A further object of the present invention is to provide an improved retainer for use in a linear motion rolling contact guide unit of the finite stroke type capable of keeping the sliding resistance of the guide unit at lower a level.

Other objects, advantages and novel features of the present invention will become apparent from the following detailed description of the invention when considered in conjunction with the accompanying drawings.

DESCRIPTION OF THE PREFERRED EMBODIMENTS

Figure 1:
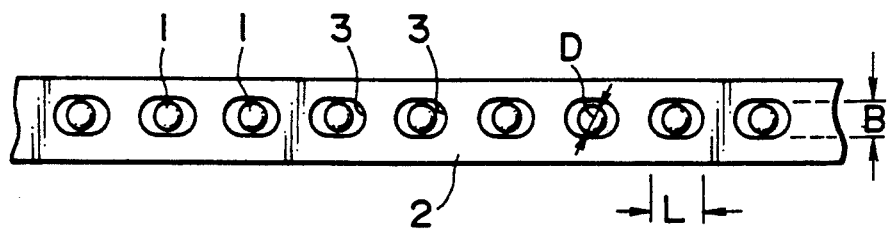
FIG. 1 is a schematic illustration showing in fragmentary front view a retainer for use in a linear motion guide unit constructed in accordance with one embodiment of the present invention.
Figure 6:
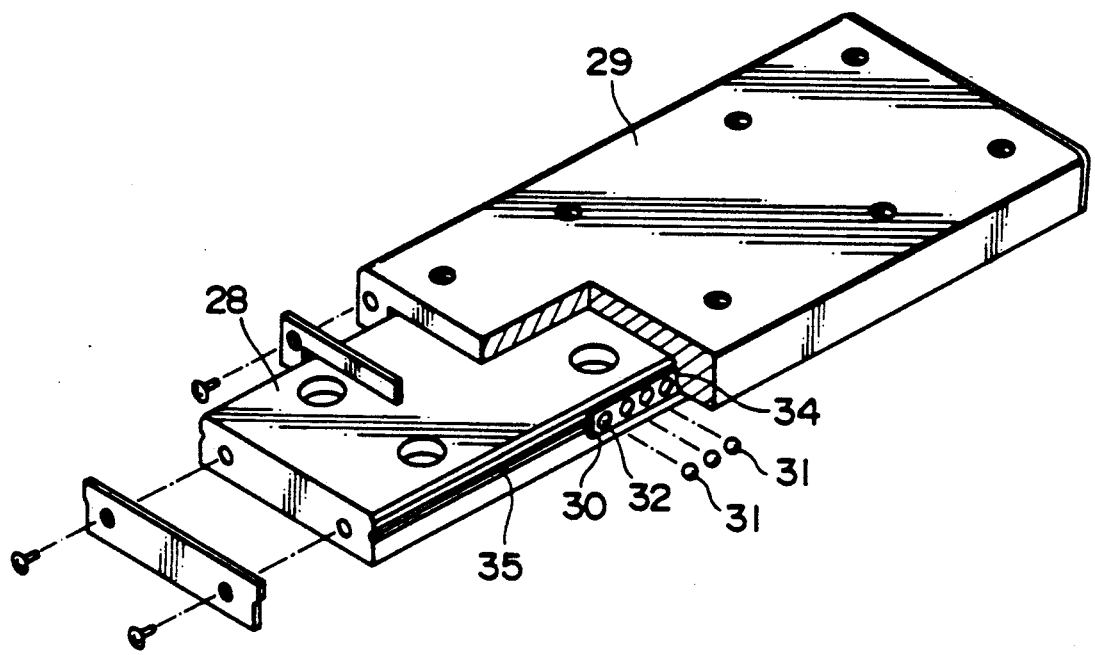
FIG. 6 is a schematic illustration showing in partly exploded, perspective view with parts broken away a typical prior art linear motion rolling contact guide unit of the finite stroke type.
Figure 7:
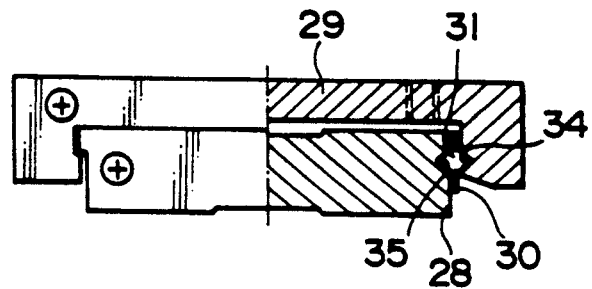
FIG. 7 is a schematic illustration showing in end view with its right-hand half in transverse cross section the guide unit shown in FIG. 6.

Referring now to FIG. 1, there is schematically shown a part of a retainer 2 constructed in accordance with one embodiment of the present invention. As shown, the retainer 2 is generally comprised of an elongated plate having a predetermined thickness and width such that it may be advantageously provided in a guide channel defined by a pair of associated inner and outer guide grooves as described with reference to FIGS. 6 and 7 above.

The retainer plate 2 illustrated in FIG. 1 is formed with a plurality of windows or pockets 3 spaced apart from one another as arranged along a longitudinal axis thereof. Preferably, these pockets 3 are provided at a predetermined interval, though the present invention should not be limited only to such a regularly spaced arrangement. Each of the pockets 3 has a first size B in the transverse or widthwise direction of the elongated retainer plate 2 and a second size L in the longitudinal direction, i.e., normal to the transverse direction, of the elongated retainer plate 2. A ball 3 having a diameter D as a rolling member is rotatably provided in the associated pocket 3. In the present embodiment, the first size B of the pocket 3 is set larger, preferably slightly larger, than the diameter D of the ball 3 and the second size L of the pocket 3 is set substantially larger than the first size B. As a result, generally speaking, the pocket 3 has a shape of a slot or an oval shape. It is to be noted that according to the principle of the present invention, it is not necessary for all of the pockets 3 have such a slot-shaped pocket 3, but it is sufficient that at least some of these pockets 3 of the elongated retainer plate 2 have such a slot shape.

With the provision of such slot-shaped pockets 3, the number of balls 3 which come into sliding contact with the ends of the associated pockets 3 during a relative motion between the rail and the slider can be reduced so that the sliding resistance between the balls 3 and the retainer 2 and for that matter between the rail and the slider can be maintained at a low level at all times. In addition, since there is less chance for the balls 1 coming into contact with the ends of the associated pockets 3 during operation, the wear is reduced and the possibility of shift in position of the retainer 2 in a guide channel and thus relative to the rail and the slider is reduced. Therefore, it is possible to maintain the sliding performance at a constant for an extended period of time.

Figure 2:
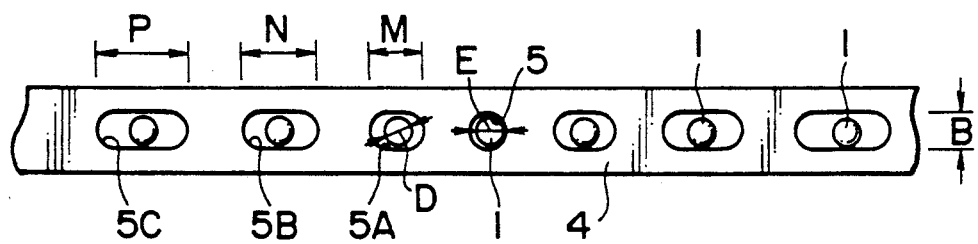
FIG. 2 is a schematic illustration showing in fragmentary front view a retainer for use in a linear motion guide unit constructed in accordance with another embodiment of the present invention.

Now, turning to a retainer 4 constructed in accordance with another embodiment of the present invention shown in FIG. 2, the retainer 4 is basically comprised of an elongated plate having a predetermined thickness and width and it is also formed with a plurality of windows or pockets 5, 5A, 5B, 5C, ... etc. spaced apart from each other as arranged along the longitudinal axis of the plate 4. In the present embodiment, the center pocket 5, which is located at the middle of the elongated plate 4, is substantially circular in shape and thus its first size B is substantially the same as its second size and larger, preferably slightly larger, than the diameter E of the ball 1 received therein. Those pockets 5A, 5B, 5C, ... etc. which are located progressively further away from the center pocket 5 and thus toward the ends of the retainer plate 4 have second sizes M, N, P, ... etc. which increase progressively as separated further away from the center pocket 5. All of the pockets 5, 5A, 5B, 5C, ... etc. may have the same first size B, which is larger, preferably slightly larger, than the diameter E of the balls 1, or the first size B may also vary in a desired manner as separated further away from the center pocket 5, if desired.

With the structure of the present embodiment also, the number of balls 1 which may come into contact with the ends of the associated pockets can be decreased so that the sliding resistance between the balls 1 as rolling members and the retainer 4 and, therefore, between the rail and the slider can be significantly reduced and maintained at a low level at all times. As a modification of this embodiment, two or more pockets 5 having a substantially circular shape may be provided at the central portion of the elongated retainer plate 4, if desired.

Figure 3:
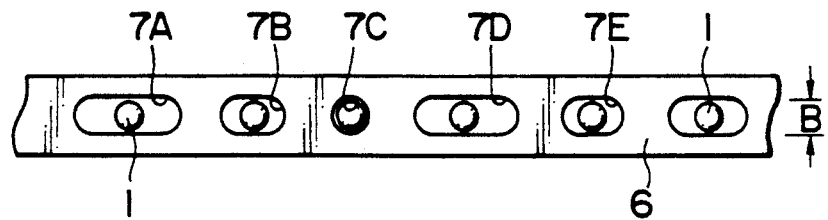
FIG. 3 is a schematic illustration showing in fragmentary front view a retainer for use in a linear motion guide unit constructed in accordance with a further embodiment of the present invention.

Now, referring to FIG. 3, there is also provided a retainer 6 constructed in accordance with a further embodiment of the present invention, and the present retainer 6 is also generally comprised of an elongated plate formed with a plurality of windows or pockets 7A, 7B, 7C, 7D, 7E . . . etc. each of which receives therein a ball 1 as a rolling member. In this embodiment, the pockets 7A, 7B, 7C, 7D, 7E, . . . etc. have substantially the same first size B, but they may have differing second sizes in a random fashion. That is, each of the pockets 7 may have a different second size, or, alternatively, some of the pockets 7 may have a first value of second size and some of the pockets 7 may have a second value of second size in a staggered or random fashion. In this case, the second size may have a value substantially equal to the value of the first size or a value larger than or significantly larger than the value of the first size.

The structure of this embodiment also allows to keep the sliding resistance of a linear motion guide unit at a low level.

Figure 4:
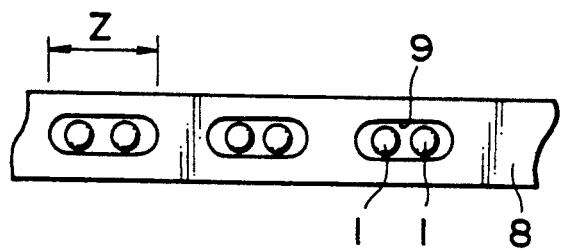
FIG. 4 is a schematic illustration showing in fragmentary front view a retainer for use in a linear motion guide unit constructed in accordance with a still further embodiment of the present invention.

Referring to FIG. 4, there is schematically shown a part of a retainer 8 constructed in accordance with a still further embodiment of the present invention. The retainer 8 is similarly comprised of an elongated plate which is formed with a plurality of windows or pockets 9 spaced apart from each other and arranged along the longitudinal axis of the plate. In this embodiment, each of the pockets 9 has a first size which is larger, preferably slightly larger, than the diameter of the ball 1 and a second size Z which is substantially larger than the first size and enough to receive two balls 1. That is, the value of the second size Z is preferably set larger, preferably slightly larger, than a sum of the diameters D of the two balls 1 provided in the pocket 9.

This embodiment also allows to keep the sliding resistance at a low level at all times since the number of balls 1 which may come into contact with the ends of the associated pockets 9 is decreased. In addition, since each of the pockets 9 receives therein two balls 1, its load bearing capacity is increased so that it is suitable for use in heavy duty environments. As a modification of this embodiment, the slot-shaped pockets 9 may have different values for the second size, if desired, as described above. As a further modification, each of the pocket 9 may also be so defined to receive therein three or more balls 1 and some of the pockets 9 may receive different number of balls 1.

Figure 5:
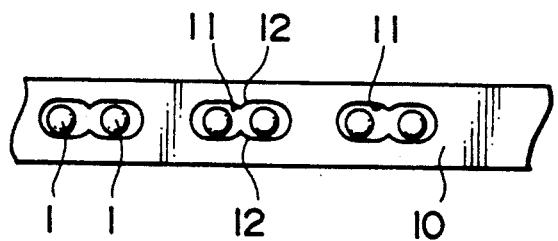
FIG. 5 is a schematic illustration showing in fragmentary front view a retainer for use in a linear motion guide unit constructed in accordance with a still further embodiment of the present invention.

FIG. 5 illustrates a modification of the embodiment shown in FIG. 4. That is, the present retainer 10 also have an elongated pocket 11 which can receive therein two or more balls 1. However, in the FIG. 5 embodiment, the retainer plate 10 is provided with a separator 12 which projects into the pocket 11 from its periphery so as to keep the two adjacent balls 1 separated away from each other and prevent them from coming into sliding contact. Thus, the value of the second size of each of the pockets 11 should be set at a value which is larger than a sum of the diameters of the balls 1 received in the associated pocket 11.

With the structure of the FIG. 5 embodiment, even the balls 1 in the same pockets can be prevented from interacting each other during operation, the sliding resistance can be decreased even more as compared with the FIG. 4 embodiment just described above.

As described above, in accordance with the present invention, since the number of rolling members which come into contact with the ends of associated pockets is decreased, the sliding resistance of the retainer and thus of a linear motion guide unit can be significantly decreased and maintained at a low level at all times. Since the interaction between the retainer and the associated rolling members is reduced, the retainer can be properly maintained in position in its associated guide unit at all times, which also contributes to keep the sliding resistance of a linear motion guide unit at a low level. Since the present retainer can be maintained properly in position in its associated guide channel, it is prevented from slipping away from the guide channel.

Besides, in accordance with the present invention, even if there are errors, such as asperity or twist, in the planarity of the inner and/or outer guide grooves due, for example, to manufacturing tolerances or the like, such errors can be advantageously absorbed by the gap between the retainer pockets and the associated rolling members. Even if the rolling members are in a preloaded condition, since there is a predetermined gap between the rolling members and the retainer pockets and thus the number of the rolling members that may strongly interact with the retainer is reduced, the sliding resistance of the retainer and thus its associated linear motion guide unit can be maintained at a low level.

While the above provides a full and complete disclosure of the preferred embodiments of the present invention, various modifications, alternate constructions and equivalents may be employed without departing from the true spirit and scope of the invention. For example, although use has been made of balls as rolling members in the above-described embodiment, use may also be made of rollers as rolling members. In the case where balls are used as the rolling members, its characteristic size is a diameter of the balls, whereas, in the case where use is made of rollers as the rolling members, the characteristic size can be either their height or their diameter. Therefore, the above description and illustration should not be construed as limiting the scope of the invention, which is defined by the appended claims.

What is claimed is:

1. A retainer for use in a linear motion guide unit, comprising an elongated plate which is formed with a plurality of pockets spaced apart from each other and arranged in a line along a longitudinal axis of said plate, at least some of said pockets having a first size in a transverse direction perpendicular to said longitudinal axis and a second size in a longitudinal direction, said first size having a value larger than a characteristic size of a rolling member to be received in said pocket and said second size having a value larger than the value of said first size so that said at least some of said pockets are generally in the shape of a slot, the value of said second size increasing progressively toward each end of said plate from a central portion of said plate and at least one of said pockets located in said central portion of said plate being substantially circular in shape.

2. The retainer of claim 1, wherein the value of said first size is slightly larger than the value of said characteristic size.

3. The retainer of claim 1, wherein all of the remaining pockets are generally in the shape of a slot.

4. The retainer of claim 1, wherein at least one of said some of said pockets has a value for its second size which is different from the value of the second size of another of said some of said pockets.

5. The retainer of claim 1, wherein said some of said pockets have two or more different values for the second size.

6. The retainer of claim 1, wherein said rolling members are balls and said characteristic size is a diameter of said balls.

7. The retainer of claim 1, wherein said rolling members are rollers and said characteristic size is a height of said rollers.

8. The retainer of claim 1, wherein said rolling members are rollers and said characteristic size is a diameter of said rollers.

9. A retainer for use in a linear motion unit, comprising an elongated plate which is formed with a plurality of pockets spaced apart from each other and arranged in a line along a longitudinal axis of said plate, at least some of said pockets having a first size in a transverse direction perpendicular to said longitudinal axis and a second size in a longitudinal direction, said first size having a value larger than a characteristic size of a rolling member to be received in said pocket and said second size having a value larger than the value of said first size so that said at least some of said pockets are generally in the shape of a slot, wherein at least one of said some of said pockets has a value for its second size which is large enough to allow at least two rolling members to be received in said pocket, thereby defining an elongated pocket and wherein said plate is formed with at least one separator projecting into said elongated pocket from a periphery of the pocket so as to keep two adjacent rolling members provided in said elongated pocket functionally separated from each other.

* * * * *